United States Patent [19]

Eshoo

[11] 4,174,082
[45] Nov. 13, 1979

[54] SOLAR POWERED HOT AIR BALLOON

[76] Inventor: Frederick Eshoo, 151 Kakh Ave., Tehran, Iran

[21] Appl. No.: 860,711

[22] Filed: Dec. 15, 1977

[51] Int. Cl.[2] ................................. B64B 1/58
[52] U.S. Cl. ......................... 244/31; 244/98
[58] Field of Search .................. 244/31, 33, 96–98; 46/89

[56] References Cited

U.S. PATENT DOCUMENTS

| 3,195,834 | 7/1965 | Huch | 244/31 |
| 3,220,671 | 11/1965 | Ashman et al. | 244/31 |
| 3,337,162 | 8/1967 | Bauserman | 244/31 |
| 3,391,883 | 7/1968 | Curtis | 244/31 |
| 3,565,368 | 2/1971 | Byron | 244/31 |
| 3,945,591 | 3/1976 | Cameron | 244/31 X |

OTHER PUBLICATIONS

Malpas, "Harnessing Solar Radiation", *Aerostat*, 8/1974, p. 154.
*Ballooning Magazine*, vol. 3, No. 1, Winter 1973/1974, pp. 9–17.
Barnes "First Flight of the Solar Firefly", *Aerostat*, 12/1973, pp. 4, 6 and 7.
Chappell, "Solar Balloon Flights", *Aerostat*, 4/1975, p. 307.
Croker, "Harnessing Superheat", *Aerostat*, 4/1974, p. 47.
*Cameron Balloon Catalog*, 9/1977, back page.

*Primary Examiner*—Barry L. Kelmachter
*Attorney, Agent, or Firm*—Hill, Gross, Simpson, Van Santen, Steadman, Chiara & Simpson

[57] ABSTRACT

A solar powered hot air balloon is disclosed having an envelope with an opaque portion and a transparent portion arranged so as to utilize solar heating to heat air within the envelope. The solar heating air may either by sufficient to provide the entire free lift or may be combined with air from a hot air generating system carried by a gondola supported by the envelope. The opaque portion of the envelope has a substantially black inner surface and a light reflecting outer surface with the black inner surface being positioned so as to receive a maximum amount of sunlight through the transparent portion for a given average position of the sun.

19 Claims, 10 Drawing Figures

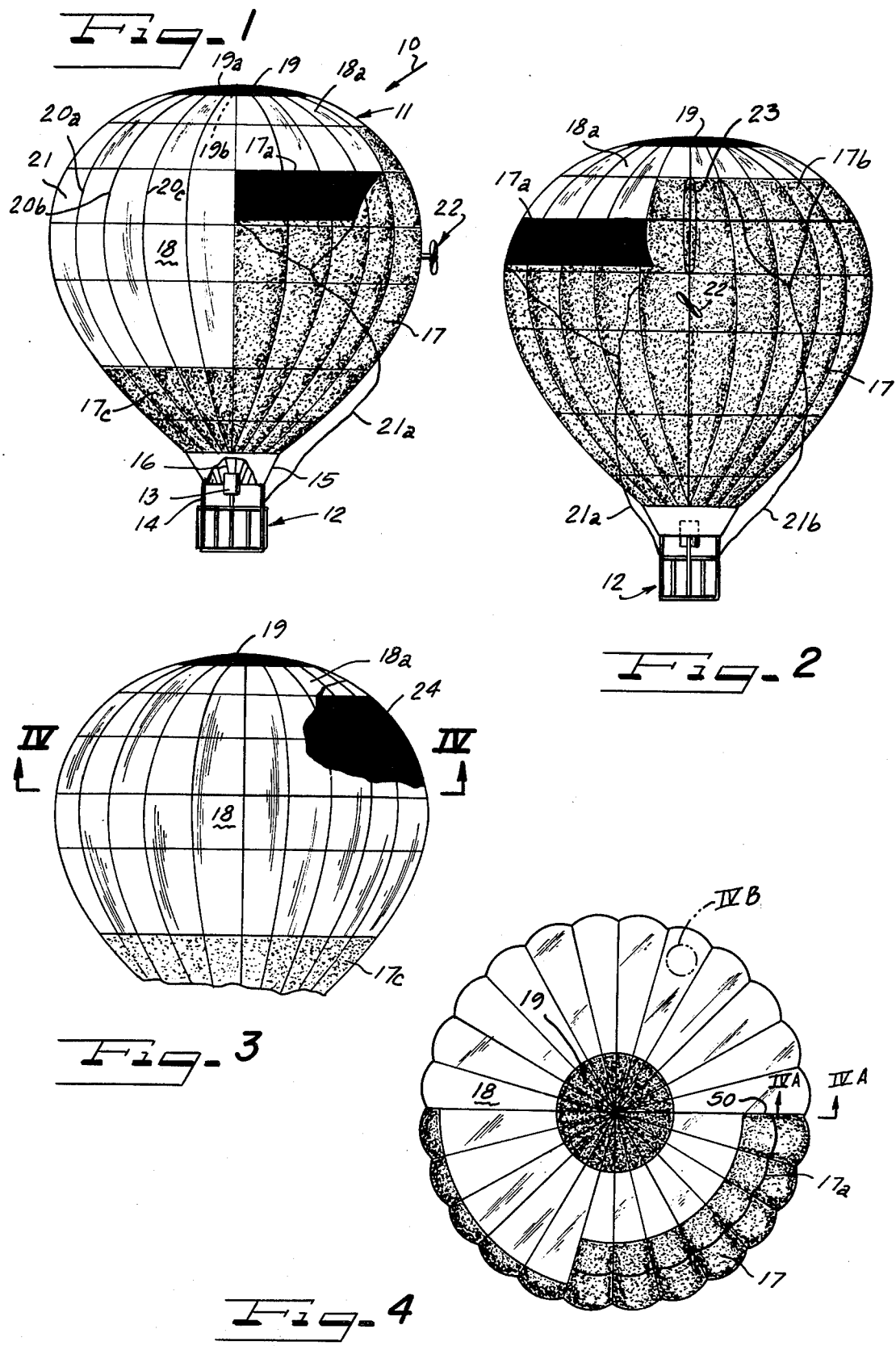

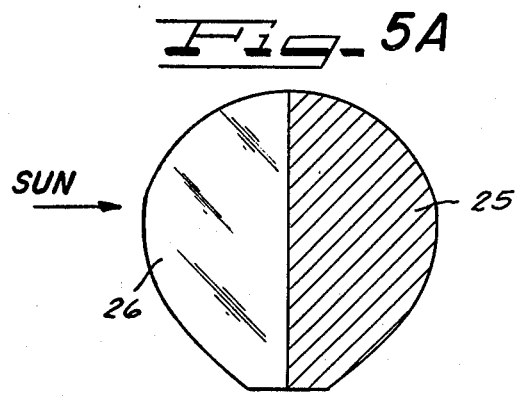
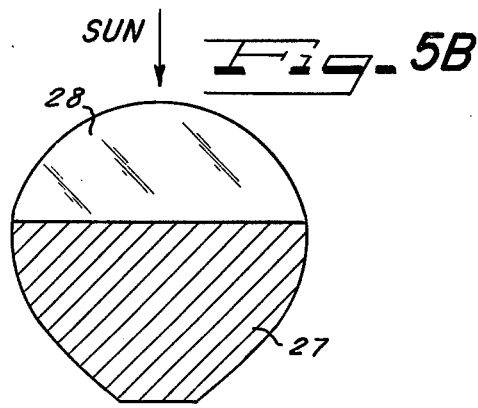
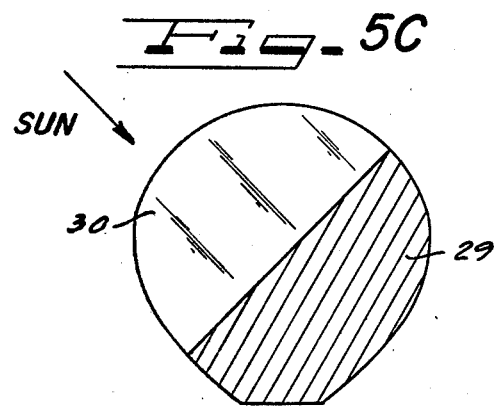
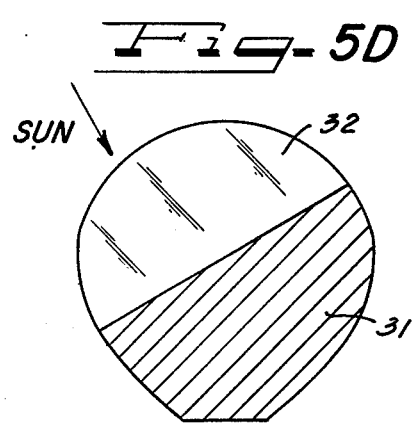
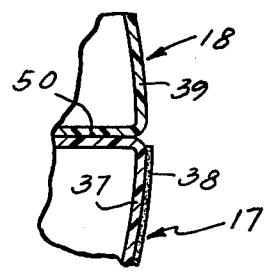
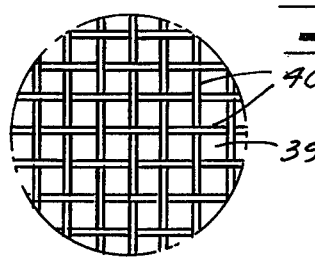

4,174,082

SOLAR POWERED HOT AIR BALLOON

BACKGROUND OF THE INVENTION

This invention relates to hot air balloons and more particularly to use of solar energy for heating the hot air within the balloon.

Hot air ballooning has become an increasingly popular sport in recent years. In virtually all balloons, the hot air required for buoyancy is generated by a burner which uses propane as a fuel. Typical flight durations with these balloons are from one to two hours. However, by carrying a very heavy overload of fuel, a few flights over twelve hours have been possible. These long flights are for special record-breaking attempts and are not practical for the sport balloonist.

While relatively short flights of one or two hours may be acceptable to many balloonists, it would be most desirable to make longer flights as is commonly the case with gas balloons such as those containing hydrogen or helium. With gas balloons, typical flight durations are more in the range of five to fifteen hours. To make hot air balloons fly, it is necessary to heat air within the balloon sufficiently so that the mass of internal air is less than the mass of the surrounding air by an amount equal to the mass of the balloon and its load. In addition to heating the air with propane or other sources of fuel, it has been known to use solar energy to heat balloons. It is a natural consequence of flying during sunlight hours that some energy will be absorbed by the balloon skin, particularly if it is dark colored, making some contribution toward heat build up. In most cases this is trivial or insignificant.

Two balloons are known to have been designed and built with he intention of capturing sufficient solar energy to fly under complete solar power. One was of very large size (Barnes) and built of a black, heatabsorbing fabric. The efficiency of solar heat collection was relatively low, but because of the great size of the balloon, it was able to make sustained flights using solar heat only. The Barnes balloon was much too large and cumbersome to be practical for sport flying.

In a design by Michaelis, an outer envelope of transparent material and an inner balloon of black material having 80% of the volume of the outer balloon was constructed. While this balloon flew successfully and had only about half the volume of the previously described design, the balloon was quite fragile and was substantially more difficult to fly, again rendering it unsuitable for general sport flying.

SUMMARY OF THE INVENTION

It is an object of the present invention to increase the length of flight duration of hot air balloons by use of attracting and utilizing solar energy.

It is a further object of this invention to provide a balloon envelope which collects solar energy and is also of an overall size which is practical for general sport flying.

With the invention described herein, a new and unique design for a solar powered balloon which has flying characteristics similar to the typical propane powered models and which is not limited to the short durations of propane powered flight is disclosed. The balloon of the invention may fly totally on solar heat on clear, bright days and can also fly using a minimum amount of propane generated heat along with a major amount of solar heat.

According to the invention, three basic principles in heat collection are utilized. The balloon is constructed using a nominally transparent and an opaque material in a non-symmetrical pattern. The transparent material acts as a greenhouse covering which allows a high percentage of instant solar energy to pass through it and strike the opaque material. Once the energy is converted into long wavelength infrared radiation, the transparent portion of the envelope and a light reflecting outer side of the opaque portion of the envelope block much of the reradiation of heat, thus retaining it within the balloon.

The second principle involved is the absorption of energy into a black surface. The interior surface of the opaque portion of the balloon is dull black making it virtually a perfect absorber of the energy which falls upon it.

According to a third principle of the invention, the outer surface of the opaque material is made light reflecting or silvery to minimize radiation characteristics. Black material naturally gets warm and if it were simply a black material on both sides, it would tend to radiate heat away in both directions. This further step serves to retain heat and improve collection efficiency.

The balloon may have other conventional features such as a maneuvering vent to dump heated air for vertical control and a deflation panel to empty the balloon upon landing. The balloon of the invention also may have special features unique to solar operation which will enhance the performance or make it more versatile. The non-symmetrical pattern of the transparent and opaque materials is arranged to provide the greatest potential amount of heat absorption. To capture the most energy, the balloon must be orientated with one side towards the sun. Special controls may be installed on the balloon to rotate it on its vertical axis so that it will face in the optimum direction. Orientation can be manually controlled or heat seeking or sun seeking controls can be mounted on the balloon so that its orientation can be automatically controlled without pilot attention.

The optimum arrangement of the clear and opaque portions of the envelope will be dependent on latitude and season in which the balloon is flown as well as the time of day. In a preferred embodiment, a horizontal plane passing through a central portion of the balloon at its largest periphery intersects the opaque portion at one side of the balloon and the translucent or clear portion at an opposite side of the balloon. The balloon can be built with some of its opaque panels removable so that it can be readily converted from a configuration which is optimum for one circumstance to the optimum design for another circumstance. To accommodate the changes in elevations for a lengthy flight on a given day, such panels can be removed or adjusted while in flight.

BRIEF DESCRIPTION OF THE DRAWINGS

FIG. 1 is a side view of the solar powered hot air balloon of this invention;

FIG. 2 is a rear view of the balloon of FIG. 1;

FIG. 3 is a front view of the balloon of FIG. 1;

FIG. 4 is a cross-sectional view taken along the line IV—IV of FIG. 3;

FIG. 4A is a fragmentary enlarged view of a portion of the cut edge of the envelope shown in FIG. 4 along the line IVA—IVA;

FIG. 4B is an enlarged fragmentary view of a portion of the envelope material shown in FIG. 4 at IVB; and FIGS. 5A through 5D are side views of other embodiments of the balloon of this invention wherein transparent and opaque portions of the envelope are arranged in different patterns.

DESCRIPTION OF THE PREFERRED EMBODIMENTS

The solar powered hot air balloon of this invention is generally shown at 10 in FIG. 1. A balloon envelope 11 is provided having a substantially circular cross-section with respect to a vertical axis. The envelope 11 supports a gondola 12 by use of gondola supports 14 and envelope support cables 16. A hot air generating system 15 which, in one preferred embodiment, comprises a burner 13 may be mounted on the gondola or on the envelope for supplying hot air to supplement air heated by solar energy. A skirt 15 may be provided directly above the gondola 12. This skirt shelters the burner 13 from excessive wind currents and improves the overall efficiency of operation of the burner 13.

The envelope 11 consists of an opaque portion 17 having a light reflecting outer surface and an opaque black light absorbing inner surface 24 as shown most clearly in FIG. 3. The opaque portion 17 in one preferred form of the invention constitutes approximately one half of the total balloon area. A base portion 17c of the opaque portion surrounds the base of the balloon. Upper edges of the opaque portion 17 are separated from a top cap 19 of the balloon by a circular portion of transparent material 18a. Also along the upper edge of the opaque portion 17 are provided first and second curtains 17a and 17b which are attached to a curtain control line 21a or 21b. Velcro strips sewn along upper and side edges of the curtains attach the curtains to the transparent portion 18. By pulling on the control lines 21a or 21b, the curtains can be pulled free to increase the ratio of transparent portion area to opaque portion area adjacent a top part of the balloon. Consequently, if the sun is directly overhead or nearly overhead, additional sunlight may enter the balloon through the uncovered transparent portions.

The envelope 11 may be constructed in known manner by use of gores 21 joined at seams 20a, 20b, 20c for example. A top cap 19 may be provided over the top of the balloon having an outwardly facing opaque surface 19a and an inner light reflecting surface 19b.

In order to face major portions of the transparent portion 18 toward the sun, a maneuvering propeller 22 may be located on a periphery of the envelope near the equator. By periodically energizing this propeller, the balloon is rotated about its vertical axis so as to position the transparent portion 18 towards the sun. Obviously, other maneuvering systems may be employed including a side maneuvering vent.

As shown in FIG. 2, a maneuvering vent 23 may be provided along an upper backside of the balloon.

Referring to FIG. 3, when viewing the balloon from the front side which corresponds to the preferred entry of light rays from the sum, it can be seen that the sunlight passes through the frontal transparent portion 18 so as to strike the opaque surface 24 at the back of the balloon.. Here, the curtain 17a is in the up position.

In the cross-sectional view of FIG. 4, the profile is shown which would be exposed to the sun if the sun were directly overhead. Here, the effect of removing one of the curtains 17b is shown.

In expanded FIGS. 4a and 4b, construction details for the envelope material are illustrated. As shown in FIG. 4a for the opaque portion 17 a fabric 37 is provided which is preferably a dull black. On the outer side of the fabric 37 a coating 38 is applied of aluminum or other shiny metal so as to create a light reflecting surface. The transparent portion 18 is constructed of a transparent plastic 39 joined along a seam 50 to the fabric 37.

As shown in FIG. 4B, the transparent film or plastic 39 may include a fibrous reinforcement mesh 40 to add structural strength.

The transparent material used in the balloon must have the characteristics of high transmission of the energy in the solar spectrum, high flexibility and resistance to folding and handling damage, and long term resistance to temperatures in the range of 200° to 250° F. It must also be reasonably lightweight, susceptible to fabrication by conventional means, and preferably should be a barrier to long-wave infrared radiation. Many plastic films could be considered for the application including polyesters and polycarbonates. In order to provide some of the strength and durability requirements, it is possible to add the mesh fibrous scrim reinforcement 40 to the plastic in a preferred embodiment.

The opaque material must be an efficient absorber of solar energy. Any dark color tends to absorb a large proportion of the energy but to be most effective the surface should be dull and black such as black nylon. Any of the conventional hot air balloon fabrics would be suitable if properly colored. The outside surface of the opaque material has a shiny metallic appearance. For this purpose, aluminum pigment in an elastomer coating may be useful. Better however, would be a surface coating of vapor deposited aluminum protected by a transparent elastomer coating. Another possibility would be to laminate a layer of bright metallized polyester film at the outer surface of the fabric but with greater overall weight and expense.

Typical weights for materials used in the balloon envelope are 1.5 to 3 ounces per square yard.

Variations in the positioning of the transparent portion 18 and opaque portion 17 may be chosen so as to optimize for a given latitude. If the sun elevation were just off the horizon, the balloon might be designed to have one half of the gores transparent and the other half opaque, divided on a vertical separation line as shown in FIG. 5A at 25 and 26. On the other hand, if the sun were directly overhead. the bottom half of the balloon should be opaque and the upper half transparent as shown in FIG. B at 27 and 28. Obviously, the sun angle will vary throughout any given flight and a compromise must be made in the positioning of the transparent and opaque materials to achieve the best average collection efficiency such as shown in FIG. 5C at 29, 30 and in FIG. 5D at 31, 32, which are compromises between the arrangements shown in FIGS. 5A and 5B.

In different embodiments of the invention, the transparent and opaque portions can be staggered and the transition levels raised or lowered. The border line can also be angled at any appropriate angle as shown in FIGS. 5C and 5D.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A solar powered hot air balloon, comprising:
an envelope;
a gondola suspended from the envelope;
a highly translucent portion of the envelope;
an opaque portion of the envelope, said opaque portion having a substantially black light absorbing inner surface over substantially the entire opaque portion within the envelope positioned so as to receive a substantial portion of sunlight passing through the translucent portion;
substantially an entire outer surface of the opaque portion having a substantially total light reflecting outer surface means opposite the black inner surface for minimizing radiation of heat from within the balloon through the opaque portion;
a horizontal plane relative to level flight passing through a central portion of the balloon at its largest periphery intersecting the opaque portion at one side of the balloon and the translucent portion at an opposite side of the balloon; and
means for rotating the balloon about its vertical axis relative to level flight so as to position the translucent portion towards the sun.

2. The balloon of claim 1 in which the opaque portion comprises approximately one half the total envelope area.

3. The balloon of claim 1 in which the opaque portion comprises at least one third the total envelope area.

4. The balloon of claim 1 in which the opaque portion comprises at least one half the total envelope area.

5. The balloon of claim 1 in which, with respect to said vertical axis, parts of the opaque portion surround a base of the balloon, parts of the translucent portion surround a top of the balloon, and central portions of the balloon envelope between the top and base being formed of parts of said translucent portion at one side and parts of said opaque portion on a side opposite the one side of the balloon.

6. The balloon of claim 1 in which a layer of bright metallized polyester film is laminated on an outer surface of the opaque portion.

7. The balloon of claim 1 in which the translucent portion comprises a transparent plastic film.

8. The balloon of claim 7 in which the plastic film has long term resistance to damage when exposed to temperatures in the range 200° to 250° F. and the plastic film includes a fibrous mesh for strength.

9. The balloon of claim 1 in which said means for rotating comprises a propeller positioned on the outside of and at a central portion of the envelope.

10. The balloon of claim 1 in which the envelope has a circular horizontal cross-section with respect to said vertical axis.

11. The balloon of claim 1 in which substantially an entire upper portion of the envelope comprises the translucent portion and substantially an entire lower part of the envelope comprises the opaque portion.

12. The balloon of claim 1 in which hot air generating means is carried beneath the envelope.

13. A solar powered hot air balloon, comprising:
an envelope;
a gondola suspended from the envelope;
a highly translucent portion of the envelope;
an opaque portion of the envelope, said opaque portion having a substantially light absorbing inner surface within the envelope positioned so as to receive a substantial portion of sunlight passing through the translucent portion;
means for rotating the balloon abouts its vertical axis relative to level flight so as to position the translucent portion towards the sun; and
said opaque portion comprising black nylon with an aluminum coating over the outer surface.

14. The balloon of claim 13 in which said aluminum coating comprises an aluminum pigment in an elastomer coating.

15. The balloon of claim 13 in which said aluminum coating comprises vapor deposited aluminum protected by a transparent elastomer coating.

16. A solar powered hot air balloon, comprising:
an envelope;
a gondola suspended from the envelope;
a highly translucent portion of the envelope;
an opaque portion of the envelope, said opaque portion having a substantially light absorbing inner surface within the envelope positioned so as to receive a substantial portion of sunlight passing through the translucent portion;
means for rotating the balloon abouts its vertical axis relative to level flight so as to position the translucent portion towards the sun; and
a top cap portion having a light reflecting inner surface and a light absorbing outer surface.

17. A solar powered hot air balloon, comprising:
an envelope;
a gondola suspended from the envelope;
a highly translucent portion of the envelope;
an opaque portion of the envelope, said opaque portion having a substantially light absorbing inner surface within the envelope positioned so as to receive a substantial portion of sunlight passing through the translucent portion;
means for rotating the balloon about its vertical axis relative to level flight so as to position the translucent portion towards the sun; and
parts of said opaque portion being constructed as a pull away curtain.

18. The balloon of claim 17 in which said pull away curtain is positioned at an uppermost edge of the opaque portion near the top of the balloon.

19. A solar powered hot air balloon, comprising:
an envelope having a substantially circular cross-section with respect to a vertical axis;
a gondola supported by the envelope;
hot air generating means carried by the gondola for periodically supplying hot air to supply a portion of the total free lift of the balloon;
said envelope comprising an opaque portion and a light transmitting portion, said opaque portion having an inner light absorbing surface, said inner surface of the opaque portion being positioned so as to receive a maximum amount of sunlight through the light transmitting portion for a given average position of the sun;
substantially an entire outer surface of the opaque portion having a substantially total light reflecting outer surface means opposite the inner surface for minimizing radiation of heat from within the balloon through the opaque portion;
a horizontal plane relative to level flight passing through a central portion of the balloon at its largest periphery intersecting the opaque portion at one side of the balloon and the translucent portion at an opposite side of the balloon; and
means for rotating the balloon about its vertical axis for receiving maximum sunlight on the light absorbing inner surface.

* * * * *